US009952466B2

(12) United States Patent
Lee et al.

(10) Patent No.: US 9,952,466 B2
(45) Date of Patent: Apr. 24, 2018

(54) LIQUID CRYSTAL DISPLAY DEVICE HAVING BRANCH ELECTRODES

(71) Applicant: SAMSUNG DISPLAY CO., LTD., Yongin-si, Gyeonggi-Do (KR)

(72) Inventors: Jeongho Lee, Seoul (KR); Hyangyul Kim, Hwaseong-si (KR); Soojung Chae, Seoul (KR); Junho Song, Seongnam-si (KR); Jeanho Song, Yongin-si (KR); Sujin Lee, Siheung-si (KR); Jieun Lee, Seoul (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 191 days.

(21) Appl. No.: 14/960,653

(22) Filed: Dec. 7, 2015

(65) Prior Publication Data

US 2016/0161803 A1 Jun. 9, 2016

(30) Foreign Application Priority Data

Dec. 8, 2014 (KR) .................. 10-2014-0174822
Sep. 10, 2015 (KR) .................. 10-2015-0128544

(51) Int. Cl.
*G02F 1/1343* (2006.01)
*G02F 1/1337* (2006.01)
*G02F 1/1362* (2006.01)

(52) U.S. Cl.
CPC .. *G02F 1/133707* (2013.01); *G02F 1/134309* (2013.01); *G02F 1/134363* (2013.01); *G02F 1/133753* (2013.01); *G02F 1/136286* (2013.01); *G02F 2001/133757* (2013.01)

(58) Field of Classification Search
CPC ......... G02F 1/133707; G02F 1/134309; G02F 1/134363
USPC ........................................................ 349/141
See application file for complete search history.

(56) References Cited

U.S. PATENT DOCUMENTS

2005/0099573 A1* 5/2005 Kubo ................ G02F 1/134309
349/146

FOREIGN PATENT DOCUMENTS

| KR | 1020020002590 | 1/2002 |
| KR | 1020020002651 | 1/2002 |
| KR | 1020090126466 | 12/2009 |
| KR | 1020120021373 | 3/2012 |
| KR | 1020130071928 | 7/2013 |

(Continued)

*Primary Examiner* — Lucy Chien
(74) *Attorney, Agent, or Firm* — F. Chau & Associates, LLC (57) ABSTRACT

A liquid crystal display includes a display substrate, in which a plurality of domains is defined, includes a pixel electrode disposed in each of the plurality of domains and configured to have a plurality of branch electrodes and a common electrode. A liquid crystal layer disposed between the display substrate and an opposite substrate. A plurality of domains is arranged in a column direction and a row direction. Each of the domains includes first and second sides, a first horizontal edge, and a second horizontal edge facing the first horizontal edge. The second side is parallel with the column direction and the first side is parallel with a first slanted direction. A slit is defined between adjacent branch electrodes. The slit has a first width adjacent to the first horizontal edge, and a second width adjacent to the second horizontal edge.

20 Claims, 8 Drawing Sheets (56) References Cited

FOREIGN PATENT DOCUMENTS

| KR | 1020140005717 | 1/2014 |
|----|---------------|--------|
| KR | 1020140037688 | 3/2014 |

\* cited by examiner

LIQUID CRYSTAL DISPLAY DEVICE HAVING BRANCH ELECTRODES

CROSS-REFERENCE TO RELATED APPLICATIONS

This application claims priority under 35 U.S.C. § 119 to Korean Patent Application No. 10-2014-0174822 filed Dec. 8, 2014 and No. 10-2015-0128544 filed Sep. 10, 2015, in the Korean Intellectual Property Office, the disclosure of which is incorporated by reference herein in its entirety.

TECHNICAL FIELD

Exemplary embodiments of the present inventive concept relate to a liquid crystal display device, and more particularly to a liquid crystal display device having branch electrodes.

DISCUSSION OF RELATED ART

A liquid crystal display device may include a pair of substrates and a liquid crystal layer disposed between the substrates. The liquid crystal display device may display an image. Liquid crystal display devices may be classified into In-Plane Switching (IPS) mode, Vertical Alignment (VP) mode, or Plane-to-Line Switching (PLS) mode in accordance with a manner of activating the liquid crystal layer.

In a PLS liquid crystal display device, pixel electrodes and a common electrode isolated from the pixel electrodes may be disposed in one of the two substrates. The liquid crystal layer may be activated under a horizontal electric field that is generated between the pixel electrodes and the common electrode.

SUMMARY

Exemplary embodiments of the present inventive concept may provide a liquid crystal display device with increased image display quality.

In an exemplary embodiment of the present inventive concept, a liquid crystal display device includes a display substrate, and a plurality of domains is defined in the display substrate. The display substrate includes a pixel electrode disposed in each of the plurality of domains and configured to have a plurality of branch electrodes and a common electrode insulated from the pixel electrode. The liquid crystal display device includes an opposite substrate, and a liquid crystal layer disposed between the display substrate and the opposite electrode. A plurality of domains is arranged in a column direction and a row direction. Each of the domains includes a first side, a second side facing the first side, a first horizontal edge, and a second horizontal edge facing the first horizontal edge. The second side is parallel with the column direction and the first side is parallel with a first slanted direction with respect to the column direction. A slit is defined between adjacent branch electrodes of the plurality of branch electrodes. The slit has a first width adjacent to the first horizontal edge, and the slit has a second width, which is different from the first width, adjacent to the second horizontal edge.

The plurality of domains main include a first domain including the first side and the second side, and a second domain arranged next to the first domain in the row direction. The second domain may include third and fourth sides facing each other. The second and third sides may be disposed between the first and fourth sides. The fourth side may be parallel with a second slanted direction, and the second and third sides may be parallel with the column direction.

The first slanted direction may intersect the second slanted direction.

The first slanted direction may be symmetrical to the second slanted direction with respect to the column direction.

The first side may be longer than the second side and the fourth side may be longer than the third side.

The liquid crystal display device may include third and fourth domains sequentially arranged in the row direction. The first and third domains may be sequentially arranged in the column direction and the second and fourth domains may be sequentially arranged in the column direction. The third domain may have fifth and sixth sides facing each other. The fourth domain may have seventh and eighth sides facing each other. The sixth and seventh sides may be disposed between the fifth and eighth sides. The fifth side may be parallel with the second slanted direction and the eighth side may be parallel with the first slanted direction. The sixth and seventh sides may be parallel with the column direction.

The first slanted direction may be symmetrical to the second slanted direction with respect to the column direction.

The liquid crystal display device may include a plurality of gate lines and a plurality of data lines insulated from and crossing over the plurality gate lines. Each of the data lines of the plurality of data lines may include a first data line extending along the first and third domains and extending along the first and second slanted directions to be parallel with the first and fifth sides of the first and third domains. A second data line may be arranged between the first and second domains and between the third and fourth domains, and extending along the column direction. A third data line may be disposed adjacent to the second and fourth domains, and extending along the first and second slanted directions to be parallel with the fourth and eighth sides of the second and fourth domains.

The first data line may be symmetrical to the third data line with respect to the second data line.

Liquid crystal molecules of the liquid crystal layer may be aligned in a first orientation in the first domain, aligned in a second orientation, which intersects the first orientation, in the second domain, aligned in the second orientation in the third domain, and aligned in the first orientation in the fourth domain.

The first orientation may be parallel with the second slanted direction and the second orientation may be parallel with the first slanted direction.

The first orientation may be symmetrical to the second orientation with respect to the column direction.

The fifth side may be longer than the sixth side and the eighth side may be longer than the seventh side.

The plurality of domains may include a fifth domain, a sixth domain, a seventh domain, and an eighth domain. The fifth and seventh domains and the sixth and eighth domains may be arranged in the column direction. The fifth and sixth domains may be sequentially arranged next to the first and second domains in the row direction and the seventh and eighth domains may be sequentially arranged next to the third and fourth domains in the row direction. The first and seventh domains may have substantially the same shape as each other. The second and eighth domains may have substantially the same shape as each other. The third and fifth domains may have substantially the same shape as each other. The fourth and sixth domains may have substantially the same shape as each other.

Acute angles may be defined between the column direction and each of the branch electrodes. The acute angles may become smaller closer to the first side, and the acute angles may become larger closer to the second side.

The second horizontal edge may be longer than the first horizontal edge and the second width may be wider than the first width.

In an exemplary embodiment of the present inventive concept, a liquid crystal display device includes a display substrate including a pixel electrode including a plurality of branch electrodes and a common electrode insulated from the pixel electrode. Slits are defined between each of the branch electrodes. The liquid crystal display device includes an opposite substrate and a liquid crystal layer disposed between the display substrate and the opposite substrate. A plurality of domains is arranged in a column direction and a row direction, and a first domain and a second domain are arranged in the row direction. The first domain has a first side, and the second domain has a second side. The first side is parallel with a first slanted direction with respect to the column direction and the second side is parallel with a second slanted direction with respect to the column direction.

Each of the domains may include a first horizontal edge and a second horizontal edge connecting the first side with the second side. The first and second horizontal edges may be parallel with the row direction. Each slit may have a first width adjacent to the first horizontal edge and a second width, which is different from the first width, adjacent to the second horizontal edge.

The plurality of domains may include a third domain and a fourth domain that are sequentially arranged in the row direction. The first and third domains may be sequentially arranged in the column direction, and the second and fourth domains may be sequentially arranged in the column direction. The third domain may have a third side. The fourth domain may have a fourth side facing the third side, and the third side may be parallel with the second side.

Liquid crystal molecules of the liquid crystal layer may be arranged along a first alignment direction in the first and fourth domains. The liquid crystal molecules may be arranged along a second alignment direction, which intersects the first alignment direction, in the second and third domains.

BRIEF DESCRIPTION OF THE FIGURES

The above and other features of the present inventive concept will become more apparent by describing in detail exemplary embodiments thereof with reference to the accompanying drawings of which.

DETAILED DESCRIPTION

Exemplary embodiments of the present inventive concept will be described in more detail below with reference to the accompanying drawings, in which exemplary embodiments of the present inventive concept are shown. Exemplary embodiments of the present inventive concept, however, may be embodied in various different forms, and should not be construed as being limited only to the illustrated embodiments. Like reference numerals may denote like elements throughout the specification and drawings. In the drawings, the sizes and relative sizes of layers and regions may be exaggerated for clarity.

It will be understood that, although the terms "first," "second," and "third" may be used herein to describe various elements, components, regions, layers and/or sections, these elements, components, regions, layers and/or sections should not be limited by these terms.

Spatially relative terms, such as "beneath," "below," "lower," "under," "above," and "upper" may be used herein to describe one element or feature's relationship to another element(s) or feature(s) as illustrated in the figures. It will be understood that the spatially relative terms may encompass different orientations of the device in use or operation in addition to the orientation depicted in the figures. It will also be understood that when a layer is referred to as being "between" two layers, it can be the only layer between the two layers, or one or more intervening layers may also be present.

It will be understood that when an element or layer is referred to as being "on," "connected to," "coupled to," or "adjacent to" another element or layer, it may be directly on, connected, coupled, or adjacent to the other element or layer, or intervening elements or layers may be present.

Figure 1:
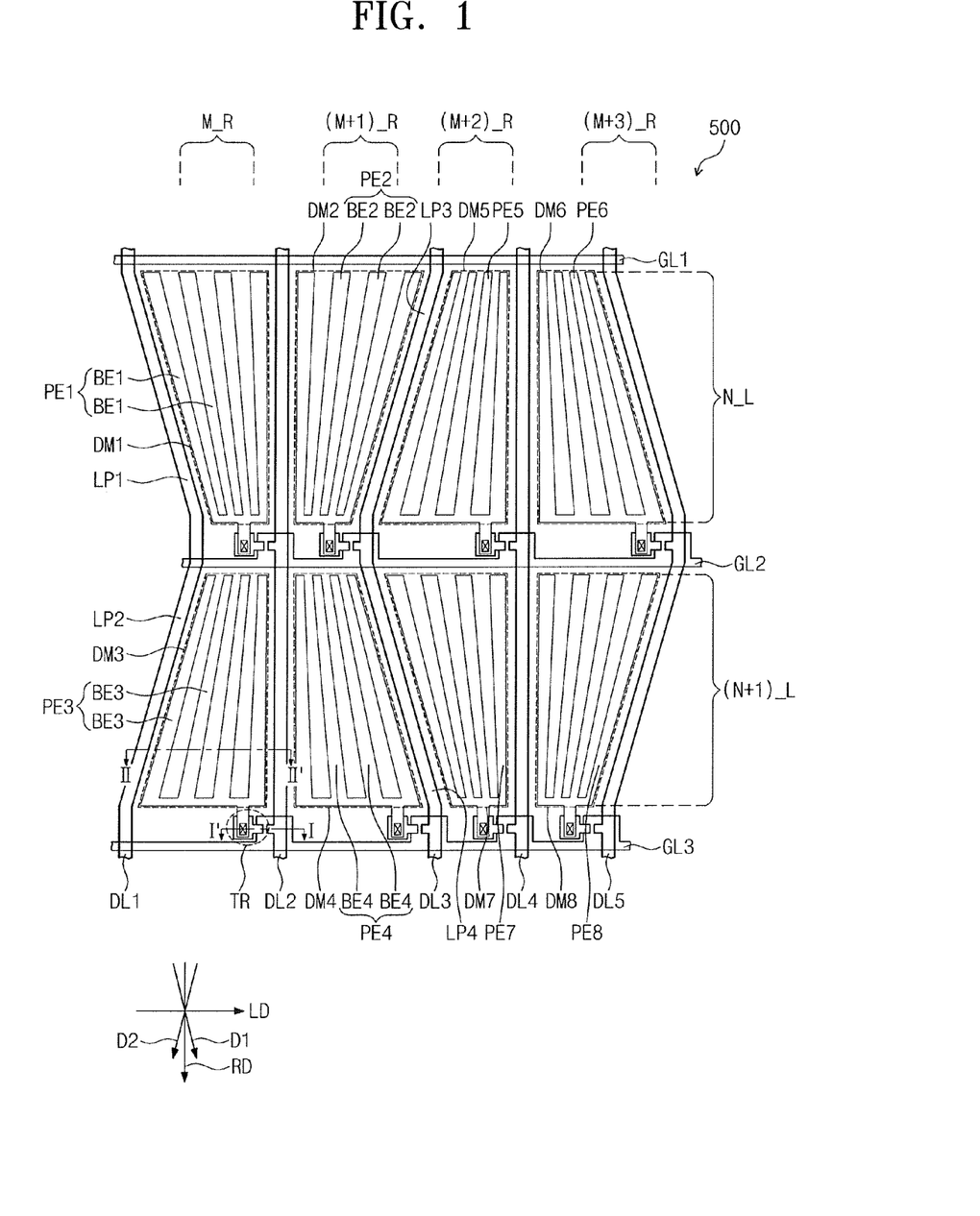
FIG. 1 is a plan view illustrating pixels of a liquid crystal display device according to an exemplary embodiment of the present inventive concept.
Figure 2:
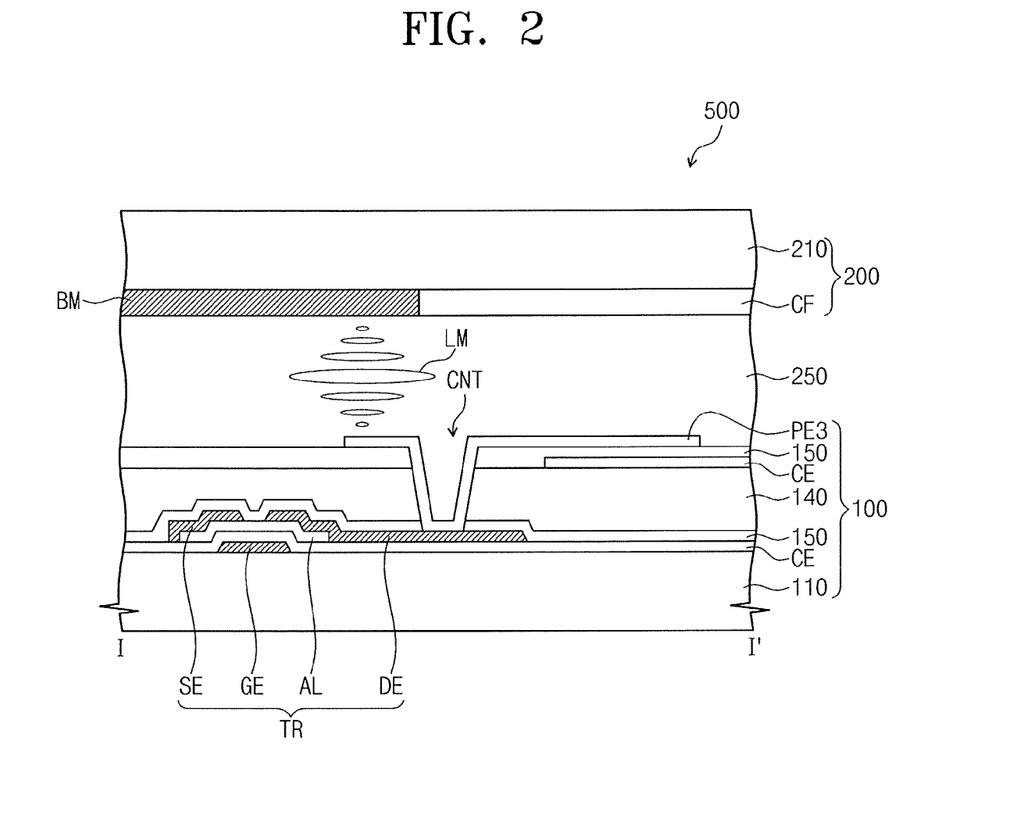
FIG. 2 is a sectional view along line I-I' of FIG. 1.
Figure 3:
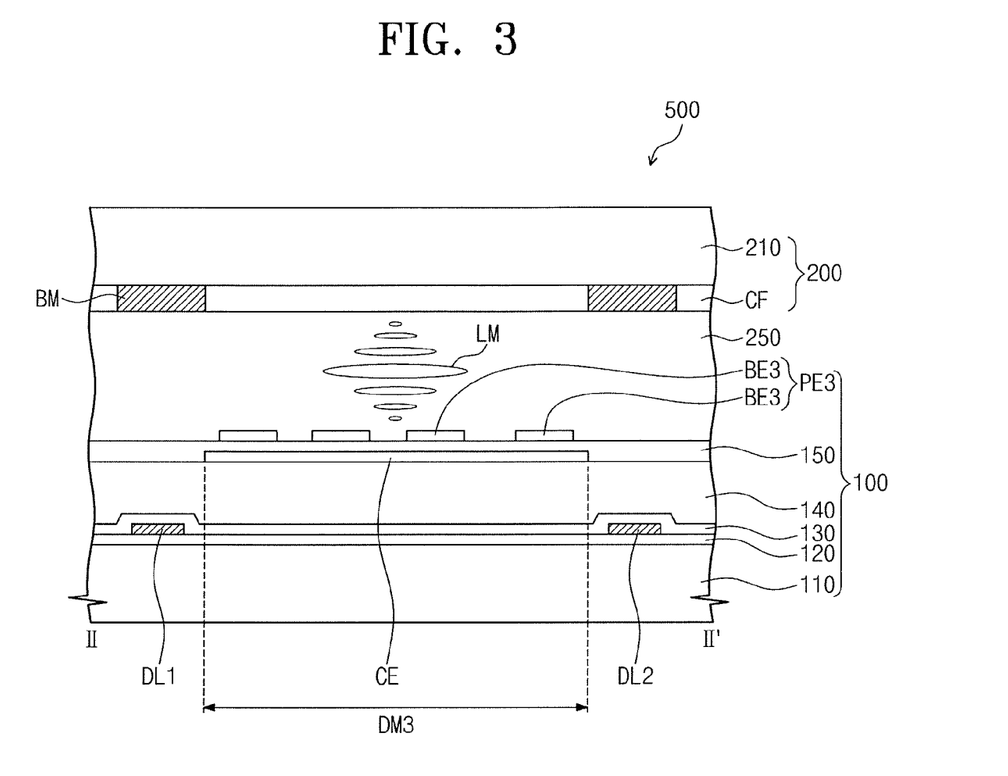
FIG. 3 is a sectional view along line II-II' of FIG. 1.

FIG. 1 is a plan view illustrating pixels of a liquid crystal display device according to an exemplary embodiment of the present inventive concept. FIG. 2 is a sectional view along line I-I' of FIG. 1. FIG. 3 is a sectional view along line II-II' of FIG. 1.

Referring to FIG. 1, FIG. 2 and FIG. 3, a liquid crystal display device 500 may include a display plate 100, an opposite plate 200, and a liquid crystal layer 250. The display plate 100 and the opposite plate 200 may face each other. The liquid crystal layer 250 may be disposed between the display plate 100 and the opposite plate 200. In an exemplary embodiment of the present inventive concept, the liquid crystal display device 500 may be driven in a PLS mode.

Referring to FIG. 1 eight pixels may be disposed on two rows and four columns, among the pixels, in the display plate 100. Other pixels except the eight pixels may be similar to the eight pixels shown in FIG. 1, and duplicative descriptions of the other pixels may be omitted.

The display plate 100 may include a first substrate 110, a plurality of gate lines, a plurality of data lines, pixel electrodes, thin film transistors electrically connected to the pixel electrodes, and a common electrode CE.

The first substrate 110 may have substantially a same optical transmittance as a glass substrate, and the plurality of gate lines may be disposed on the first substrate 110. A first insulation film 120 may be disposed on the plurality of gate lines. The plurality of data lines may be disposed on the first insulation film 120, and the plurality of data lines may be insulated from the plurality of gate lines. For example, first to third gate lines GL1, GL2 and GL3 (GL1~GL3) may be disposed on the first substrate 110, and the first insulation film 120 may be disposed on the first to third gate lines GL1~GL3. First to fifth data lines DL1, DL2, DL3, DL4 and DL5 (DL1~DL5) may be disposed on the first insulation film 120, and the first to fifth data lines DL1, DL2, DL3, DL4 and DL5 (DL1~DL5) may intersect the first to third gate lines GL1~GL3.

In an exemplary embodiment of the present inventive concept, first to eighth domains DM1~DM8 may each be disposed at intersections between two adjacent ones of the first to third gate lines GL1~GL3 and two adjacent ones of the first to fifth data lines DL1~DL5. For example, the first domain DM1 may be disposed at the intersection of the first and second gate lines GL1 and GL2 and the first and second data lines DL1 and DL2, and the fourth domain DM4 may be disposed at the intersection of the second and third gate lines GL2 and GL3 and the second and third data lines DL2 and DL3.

The first to eighth domains DM1~DM8 may be arranged in a matrix with a column RD and a row LD. For example, four domains may be arranged in the row direction LD on an N'th and [N+1]'th rows N_L and N+1_L, respectively, and two domains may be arranged in the column direction RD on an M'th, [M+1]'th, [M+2]'th and [M+3]'th columns M_R, M+1_R, M+2_R and M+3_R, respectively.

In an exemplary embodiment of the present inventive concept, the first to third gate lines GL1~GL3 may extend along the row direction LD. The second and fourth data lines DL2 and DL4 may extend along the column direction RD. The first, third and fifth data lines, DL1, DL3 and DL5, may extend respectively along first and second directions D1 and D2.

The first data line DL1 may include a first line portion LP1, and a second line portion LP2 connected with the first line portion LP1. The first line portion LP1 may extend along the first direction D1 and the second line portion LP2 may extend along the second direction D2.

The second data line DL2 may be disposed adjacent to the first data line DL1. The second data line DL2 may intersect the column direction LD, and may be disposed between the first and second domains DM1 and DM2 and between the third and fourth domains DM3 and DM4.

The third data line DL3 may be disposed adjacent to the second data line DL2. The third data line DL3 may include a third line portion LP3, and a fourth line portion LP4 connected with the third line portion LP3. The third line portion LP3 may extend along the second direction D2 and the fourth line portion LP4 may extend along the first direction D1.

In an exemplary embodiment of the present inventive concept, the first and second directions D1 and D2 may be slanted respectively from the column direction RD, and the first direction D1 may be symmetrical to the second direction D2 with respect to the column direction RD. Accordingly, the first data line DL1 may be symmetrical to the third data line DL3 with respect to the second data line DL2.

The fourth and fifth data lines, DL4 and DL5, may be sequentially arranged adjacent to the third data line DL3 in the row direction LD. The fourth data line DL4 may have the same shape as the second data line DL2. The fifth data line DL5 may have the same shape as the first data line DL1.

The thin film transistors may each be electrically connected to at least one of the plurality of pixel electrodes. Switching drive signals may be applied to the plurality of pixel electrodes. An exemplary thin film transistor TR of the thin film transistors will be described in more detail below.

The thin film transistor TR may include a gate electrode GE, an active layer AL, a source electrode SE, and a drain electrode DE. The gate electrode GE may branch out from the third gate line GL3, and may be disposed on the first substrate 110. The active layer AL may include a semiconductor material, and may be disposed on the gate electrode GE. The first insulation film 120 may be disposed between the active layer AL and the gate electrode GE. The source electrodes SE may branch out from the second data line DL2. The source electrode SE may be disposed on the active layer AL. The drain electrode DE may be isolated from the source electrodes SE. The drain electrode DE may be disposed on the active layer AL.

A second insulation film 130 may cover the thin film transistor TR, and the first to fifth data lines DL1~DL5. A third insulation film 140 may be disposed on the second insulation film 130. In an exemplary embodiment of the present inventive concept, the second insulation film 130 may include an inorganic insulator and the third insulation film 140 may include an organic insulator.

The pixel electrodes may be disposed in the first to eighth domains DM1~DM8. In an exemplary embodiment of the present inventive concept, the pixel electrodes may include first to eighth pixel electrodes PE1~PE8 arranged one by one in the first to eight domains DM1~DM8.

The first to eighth pixel electrodes PE1~PE8 may each be electrically connected with at least one of the thin film transistors TR. A contact hole CNT may penetrate the second and third insulation films 130 and 140. The third pixel electrode PE3 may be electrically connected with the drain electrode DE of the thin film transistor TR by way of the contact hole CNT.

The common electrode CE may be disposed on the third insulation film 140. A fourth insulation film 150 may be disposed on the common electrode CE. The common electrode CE may be insulated from the first to eighth pixel electrodes PE1~PE8 by the fourth insulation film 150.

A common voltage may be applied to the common electrode CE, generating horizontal electric fields between the common electrode CE and respective ones of the first to eighth pixel electrodes PE1~PE8. Thus, the horizontal electric fields may drive the orientation of liquid crystal molecules LM of the liquid crystal layer 250.

The opposite plate 200 may be coupled to the display plate 100. In an exemplary embodiment of the present inventive concept, the opposite plate 200 may include a second substrate 210, a light shielding layer BM, and a color filter CF.

The second substrate 200 may have substantially a same optical transmittance as a glass substrate. The color filter CF may be disposed over the first to eighth domains DM1~DM8 and may be disposed on the second substrate 200. The light shielding layer BM may be disposed on the second substrate 200 in positions corresponding with areas that are not occupied by the first to eighth domains DM1~DM8.

In an exemplary embodiment of the present inventive concept, each of the first to eighth pixel electrodes PE1~PE8 may include branch electrodes. For example, the first pixel electrode PE1 may include first branch electrodes BE1; the second pixel electrode PE2 may include second branch electrodes BE2; the third pixel electrode PE3 may include third branch electrodes BE3; and the fourth pixel electrode PE4 may include fourth branch electrodes BE4.

In an exemplary embodiment of the present inventive concept, the first to fourth branch electrodes BE1~BE4 may be slanted with respect to the column direction RD. The third branch electrodes BE3 among the first to fourth branch electrodes BE1~BE4 will be described in more detail below with reference to FIG. 4.

Figure 4:
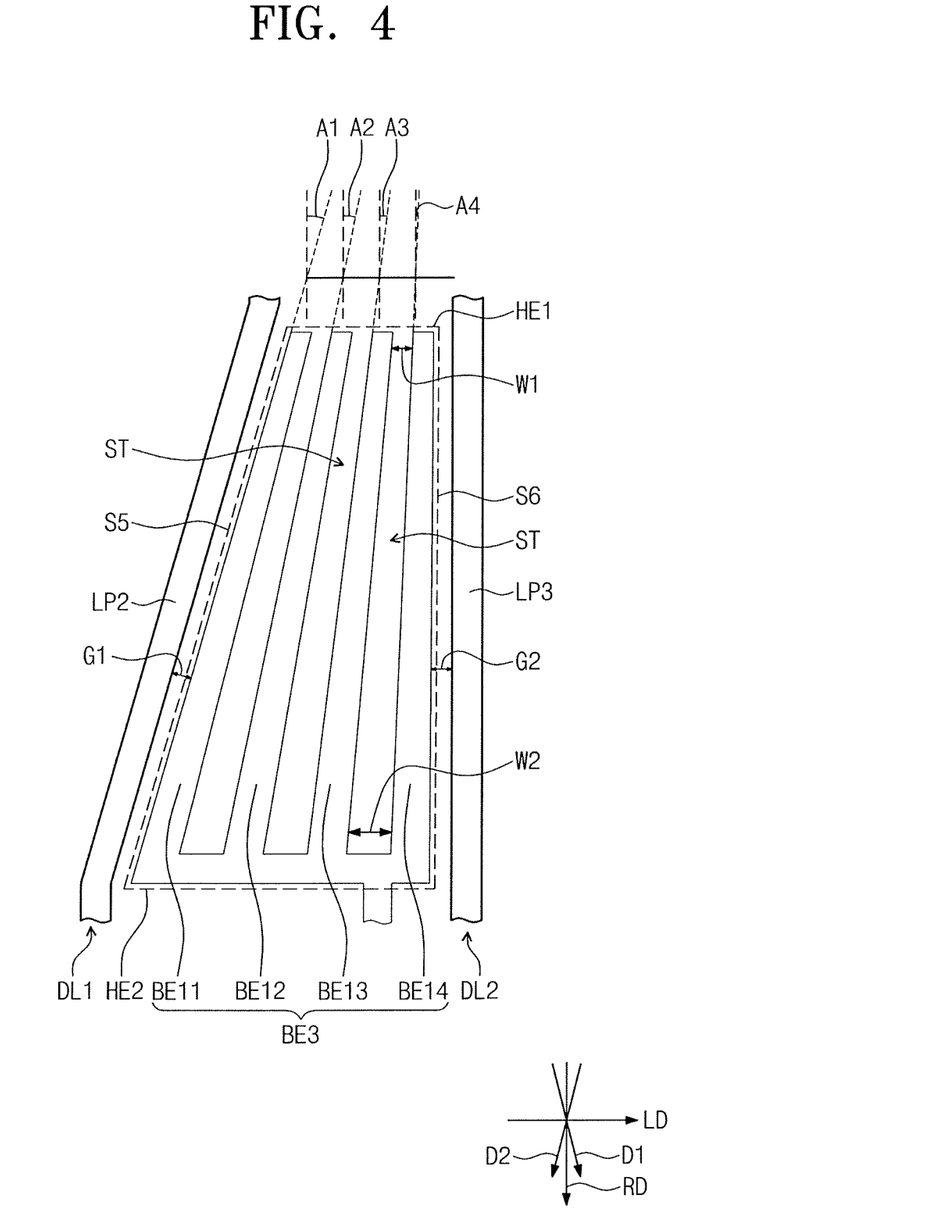
FIG. 4 illustrates the third branch electrodes shown in FIG. 1.

FIG. 4 illustrates the third branch electrodes shown in FIG. 1.

Referring to FIGS. 1 and 4, the third pixel electrode PE3 may be disposed in the third domain DM3, and may include the third branch electrodes BE3. The third branch electrodes BE3 may be separately arranged in the third domain DM3. Slits ST may be disposed between adjacent ones of the third branch electrodes BE3.

In an exemplary embodiment of the present inventive concept, the third branch electrodes BE3 may each be slanted with respect to the column direction RD at different angles.

The third branch electrodes BE3 may be divided into first to fourth branch portions BE11, BE12, BE13 and BE14 (BE11~BE14). The first to fourth branch portions BE11, BE12, BE13 and BE14 may be arranged in order between the first and second data lines DL1 and DL2. A first acute angle A1 may be defined between the column direction RD and the direction to which the first branch portion BE11 extends. A second acute angle A2 may be defined between the column direction RD and the direction to which the second branch portion BE12 extends. A third acute angle A3 may be defined between the column direction RD and the direction to which the third branch portion BE13 extends. A fourth acute angle A4 may be defined between the column direction RD and the direction to which the fourth branch portion BE14 extends. The first acute angle A1 may be larger than the second acute angle A2; the second acute angle A2 may be larger than the third acute angle A3; and the third acute angle A3 may be larger than the fourth acute angle A4.

An acute angle defined between each of the first to fourth branch parts BE11, BE12, BE13, and BE14 and the column direction RD may become larger moving along the column direction RD toward a fifth side S5 of the third domain DM3, and may become smaller moving along the column direction RD toward a sixth side S6 of the third domain DM3. In an exemplary embodiment of the present inventive concept, the fifth side S5 may be parallel with the second direction D2 and the sixth side S6 may be parallel with the column direction RD.

Among the first to fourth acute angles A1~A4, the first acute angle A1 defined by the first branch portion BE11 may be the largest of the acute angles. The first branch portion BE11 among the first to fourth branch portions BE11~BE14 may be the closest to the first data line DL1 and may be substantially parallel with the second line portion LP2. Thus, a variation of a first interval G1 between the second line portion LP2 and the first branch portion BE11 may be reduced or eliminated.

Among the first to fourth acute angles A1~A4, the fourth acute angle A4 defined by the fourth branch portion BE14 may be the smallest of the acute angles. The fourth branch portion BE14 among the first to fourth branch portions BE1~BE14 may be the closest to the second data line DL2. Thus, a variation of a second interval G2 between the second data line DL2 and the fourth branch portion BE14 may be reduced or eliminated.

When variations of the first and second intervals G1 and G2 are substantially uniform, a leakage of light through the first or second intervals G1 or G2 may be reduced or prevented, including when a peripheral area or a horizontal edge of the liquid crystal display device is relatively long.

A first horizontal edge HE1 and a second horizontal edge HE2 of the third domain DM3 may be defined. The first and second horizontal edges HE1 and HE2 may face each other, and each of the first and second horizontal edges HE1 and HE2 may connect the fifth side S5 and the sixth side S6.

In an exemplary embodiment of the present inventive concept, the second horizontal edge HE2 may be longer than the first horizontal edge HE1. When the slit ST has a first width W1 adjacent to the first horizontal edge HE1 and has a second side W2 adjacent to the second horizontal edge HE2, the second width W2 may be larger than the first width W1. Thus, a pitch between the first to fourth branch parts BE11, BE12, BE13, and BE14 adjacent to the first horizontal edge HE1 may be smaller than a pitch between the first to fourth branch parts BE11, BE12, BE13, and BE14 adjacent to the second horizontal edge HE2.

Figure 5:
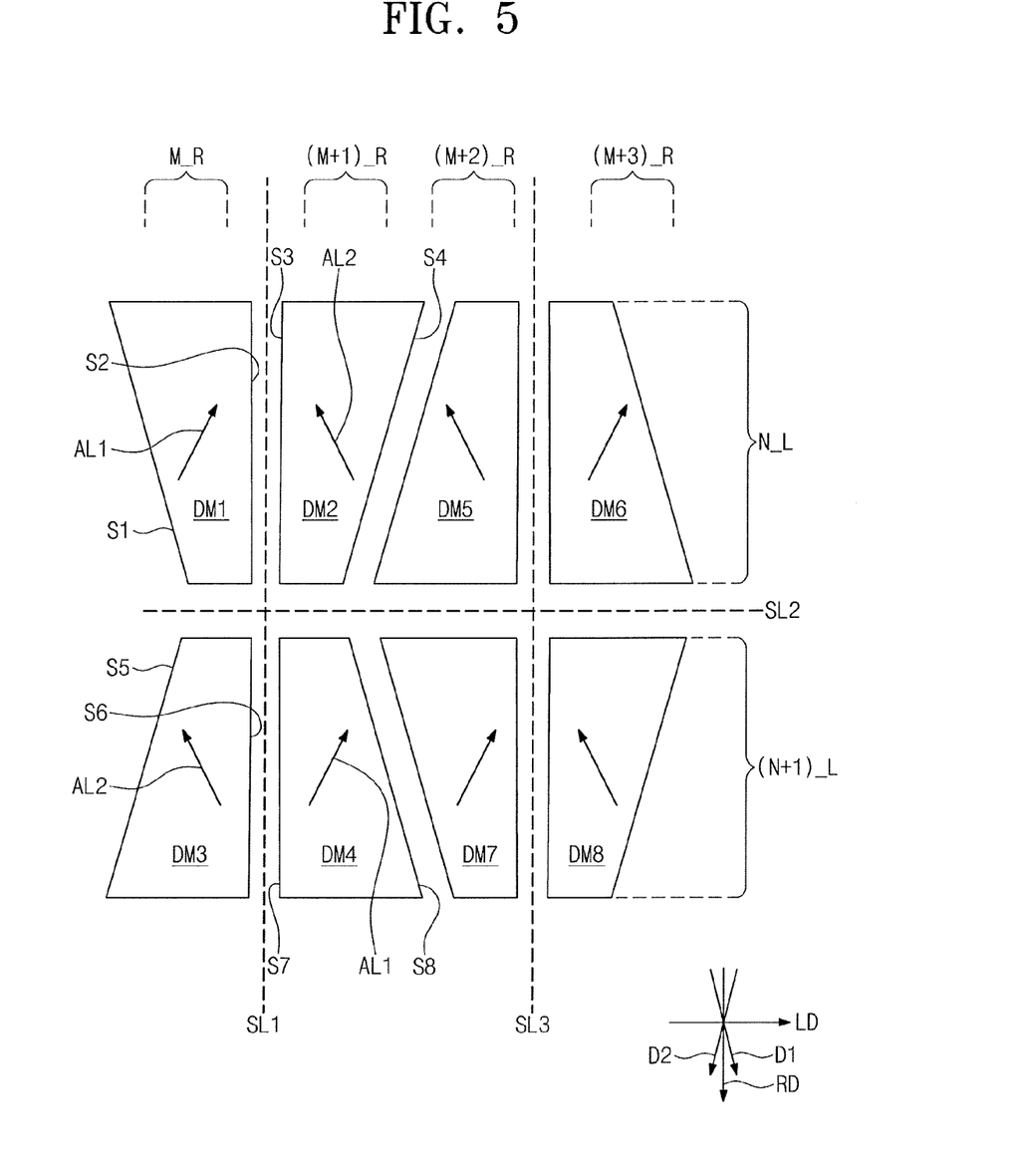
FIG. 5 illustrates orientations of liquid crystal molecules in the plurality domains shown in FIG. 1.

FIG. 5 illustrates orientations of liquid crystal molecules in the plurality domains shown in FIG. 1.

Referring to FIGS. 1 and 5 the first to fourth pixel electrodes PE1~PE4 may have different shapes and orientations from each other and the fifth to eighth pixel electrodes PE5~PE8 may have different shapes and orientations from each other. Thus, the first to fourth domains DM1~DM4 may have different shapes and orientations from each other and the fifth to eighth domains DM5~DM8 may have different shapes and orientations from each other.

The first and seventh pixel electrodes PE1 and PE7 may be substantially identical to each other in shape and orientation; the second and eighth pixel electrodes PE2 and PE8 may be substantially identical each other in shape and orientation; the third and fifth pixel electrodes PE3 and PE5 may be substantially identical each other in shape and orientation; and the fourth and sixth pixel electrodes PE4 and PE6 may be substantially identical each other in shape and orientation. Thus, the first and seventh domains DM1 and DM7 may be substantially identical each other in shape and orientation; the second and eighth domains DM2 and DM8 may be substantially identical each other in shape and orientation; the third and fifth domains DM3 and DM5 may be substantially identical each other in shape and orientation; and the fourth and sixth domains DM4 and DM6 may be substantially identical each other in shape and orientation.

Among the first to eighth domains DM1 DM8, the first to fourth domains DM1~DM4 will be described below in more detail.

The first domain DM1 may include first and second sides S1 and S2 which may face each other. The second domain DM2 may include third and fourth sides S3 and S4 which may face each other. The second and third sides, S2 and S3, may be disposed between the first and fourth sides S1 and S4.

The first side S1 may be parallel with the first direction D1 and the fourth side S4 may be parallel with the second direction D2. The second and third sides, S2 and S3, may be parallel with the column direction RD. The first and fourth sides S1 and S4 may be longer than the second and third sides S2 and S3.

The third domain DM3 may include fifth and sixth sides S5 and S6 which may face each other. The fourth domain DM4 may include seventh and eighth sides S7 and S8 which may face each other. The sixth and seventh sides S6 and S7 may be disposed between the fifth and eighth sides S5 and S8.

The fifth side S5 may be parallel with the second direction D2 while the eighth side S8 may be parallel with the first direction D1. The sixth and seventh sides, S6 and S7, may be parallel with the column direction RD. The fifth and eighth sides S5 and S8 may be longer than the sixth and seventh sides S6 and S7.

A first straight line SL1 may be disposed between the first and second domains DM1 and DM2 and between the third and fourth domains DM3 and DM4. The first domain DM1 may be symmetrical to the second domain DM2 on the first straight line SL1 while the third domain DM3 may be symmetrical to the fourth domain DM4 on the first straight line SL1.

A second straight line SL2 may be disposed between the first and third domains DM1 and DM3 and between the second and fourth domains DM2 and DM4. The first domain DM1 may be symmetrical to the third domain DM3 on the second straight line SL2 while the second domain DM2 may be symmetrical to the fourth domain DM4 on the second straight line SL2.

A third straight line SL3 may be disposed between the fifth and sixth domains DM5 and DM6 and between the seventh and eighth domains DM7 and DM8. The fifth domain DM5 may be symmetrical to the sixth domain DM6 on the third straight line SL3 while the seventh domain DM7 may be symmetrical to the eighth domain DM8 on the third straight line SL3.

In an exemplary embodiment of the present inventive concept, the liquid crystal molecules LM (see, e.g., FIG. 2) of the liquid crystal layer 250 (see, e.g., FIG. 2) may have a positive dielectric anisotropy. The liquid crystal molecules LM may be aligned in a first orientation AL1 in the first domain DM1. When an electric field is generated between the first pixel electrode PE1 and the common electrode CE (see, e.g., FIG. 2) the liquid crystal molecules LM may be aligned in the first domain DM1 in the first orientation AL1.

The electric field may drive the liquid crystal molecules LM to be aligned in a second orientation AL2 in the second domain DM2. The electric field may drive the liquid crystal molecules LM to be aligned in the second orientation in the third domain DM3. The electric field may drive the liquid crystal molecules LM to be aligned in the first orientation AL1 in the fourth domain DM4.

The liquid crystal molecules LM may be aligned in the first orientation AL1 in the sixth and seventh domains DM6 and DM7, and may be aligned in the second orientation AL2 in the fifth and eighth domains DM5 and DM8.

In an exemplary embodiment of the present inventive concept, the first orientation AL1 may intersect the second orientation AL2, and may be symmetrical to the second orientation AL2 with respect to the column direction RD.

In an exemplary embodiment of the present inventive concept, defining the first to eighth domains DM1~DM8 confined by intersections with N'th and [N+1]'th rows, N_L and N+1_L, and M'th, [M+1]'th, [M+2]'th and [M+3]'th columns, M_R, M+1_R, M+2_R and M+3_R, as a unit domain group, the unit domain group may be repeatedly arranged over substantially the whole display area of the liquid crystal display device. That is, domains of an [N+2]'th row may be substantially identical to domains of the N'th row N_L in shape and orientation, and domains of an [N+3]'th row may be substantially identical to domains of the [N+1]'th row in shape and orientation.

In an exemplary embodiment of the present inventive concept, when substantially the whole display area includes domain groups according to exemplary embodiments of the present inventive concept, some rows and some columns may include domains defined in the first orientation AL1 and other domains defined in the second orientation AL2. Each of rows or columns need not include domains which are all aligned in the same orientation.

If N'th row N_L includes only first domains DM1 defined in the first orientation AL1 and the [N+1]'th row N+1_L includes only third domains DM3 defined in the second orientation AL2, there may be a difference in the anisotropy of refractive index between the liquid crystal layers in the N'th and [N+1]'th rows, N_L and N+1_L, depending on a user's view angle. Thus, a difference of luminance, which may be visually recognized by a user, between the N'th and [N+1]'th rows N_L and N+1_L, may result in dark lines or luminance lines.

In exemplary embodiments of the present inventive concept, the N'th row N_L may include the first and fifth domains DM1 and DM5, which may be defined in the first orientation AL1, and the second and sixth domains DM2 and DM6 which may be defined in the second orientation AL2. The [N+1]'th row N+1_L may include the fourth and seventh domains DM4 and DM7, which may be defined in the first orientation AL1 and the third and eighth domains DM3 and DM9 which may be defined in the second orientation AL2. Thus, regardless of a user's view angle, a difference in the anisotropy of refractive index may be reduced or eliminated between liquid crystal layers confined in an N'th and [N+1]'th rows (e.g., N may be a positive integer). Thus, dark lines or luminance lines resulting from the difference of the anisotropy of refractive indices may be reduced or prevented, and image display quality of the liquid crystal display device may be increased.

The branch electrodes BE may be slanted and thus orientations of the liquid crystal molecules LM may be slanted. The branch electrodes BE may be parallel with the side S of the domain DM in which the branch electrodes are disposed. Thus, the branch electrodes BE and the signal lines adjacent to the branch electrodes BE may be spaced at a substantially constant interval, and thus a leakage of light between the branch electrodes BE may be reduced or eliminated and image display quality of the liquid crystal display device may be increased.

Figure 6:
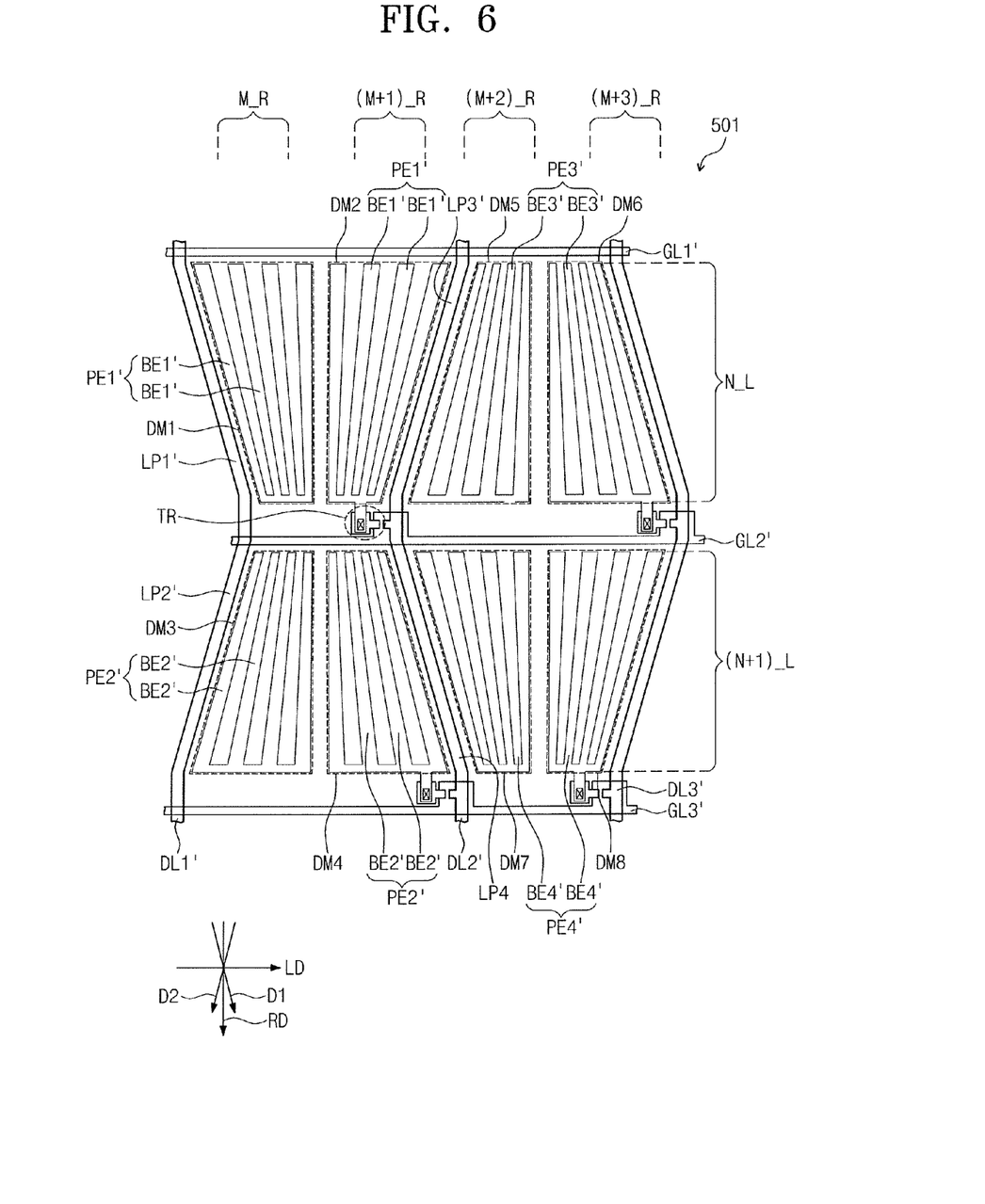
FIG. 6 is a plan view illustrating pixels of a liquid crystal display device according to another exemplary embodiment of the present inventive concept.

FIG. 6 is a plan view illustrating pixels of a liquid crystal display device according to another exemplary embodiment of the present inventive concept. The pixels described with reference to FIG. 6 may be substantially the same as the pixels described above and duplicative descriptions may be omitted.

Referring to FIG. 6, a liquid crystal display device 501 may include the display substrate 100, the opposite substrate 200, and the liquid crystal layer 250 disposed between the display substrate 100 and the opposite substrate 200. The liquid crystal display device 501 may operate in PLS mode.

Referring to FIG. 6 the liquid crystal display device 501 may include four pixels, among pixels belonging to the display substrate, disposed in two rows and two columns and two domains DM may be included in each pixel. The liquid crystal display device 501 may include first to eighth domains DM1~DM8.

The display substrate may include first to third gate lines GL1', GL2', and GL3', first to third data lines DL1', DL2', and DL3', and first to fourth pixel electrodes PE1', PE2', PE3', and PE4'.

In an exemplary embodiment of the present inventive concept, one pixel may be disposed between two adjacent gate lines of the first to third gate lines GL1'~GL3' and two adjacent data lines of the first to third data lines DL1'~DL3'. Two domains DM may be arranged along a row direction LD in one pixel. For example, the first and second domains DM1 and DM2 may be arranged along the row direction LD in a pixel disposed between the first and second gate lines GL1' and GL2' and the first and second data lines DL1' and DL2'.

The first to eighth domains DM1 DM8 may be arranged in a matrix having a column direction RD and a row direction LD. Four domains may be each arranged on an N'th row N_L (N may be a natural number) and an [N+1]'th row N+1_L in the row direction LD, and two domains may be each arranged on an M'th column M_R (M may be a natural number), an [M+1]'th column M+1_R, an [M+2]'th column M+2_R, and an [M+3]'th column M+3_R in the column direction RD.

In an exemplary embodiment of the present inventive concept, the first to third data lines DL1', DL2', and DL3' may each extend along the first direction D1 and the second direction D2. The first data line DL1' may include a first line part LP1' and a second line part LP2' connected with the first line part LP1'. The first line part LP1' may extend along the first direction D1 and the second line part LP2' may extend along the second direction D2.

The second data line DL2' may be arranged next to the first data line DL1' in the row direction LD. The second data lien DL2' may include a third line part LP3' and a fourth line part LP4' connected with the third line part LP3'. The third line part LP3' may extend along the second direction D2 and the fourth line part LP4' may extend along the first direction D1.

In an exemplary embodiment of the present inventive concept, the first direction D1 and the second direction D2 may be slanted with respect to the column direction RD. The first direction D1 may be symmetrical with the second direction D2 with respect to the column direction RD.

Each of the first to fourth pixel electrodes PE1'~PE4' may include branch electrodes BE. For example, the first pixel electrode PE1' may include first branch electrodes BE1', the second pixel electrode PE2' may include second branch electrodes BE2', the third pixel electrode PE3' may include third branch electrodes BE3', and the fourth pixel electrode PE4' may include fourth branch electrodes BE4'.

In an exemplary embodiment of the present inventive concept, the first to fourth branch electrodes BE1'~BE4' may be slanted with respect to the column direction RD. The first branch electrodes BE1' will be exemplarily described below in more detail with reference to FIG. 7.

Figure 7:
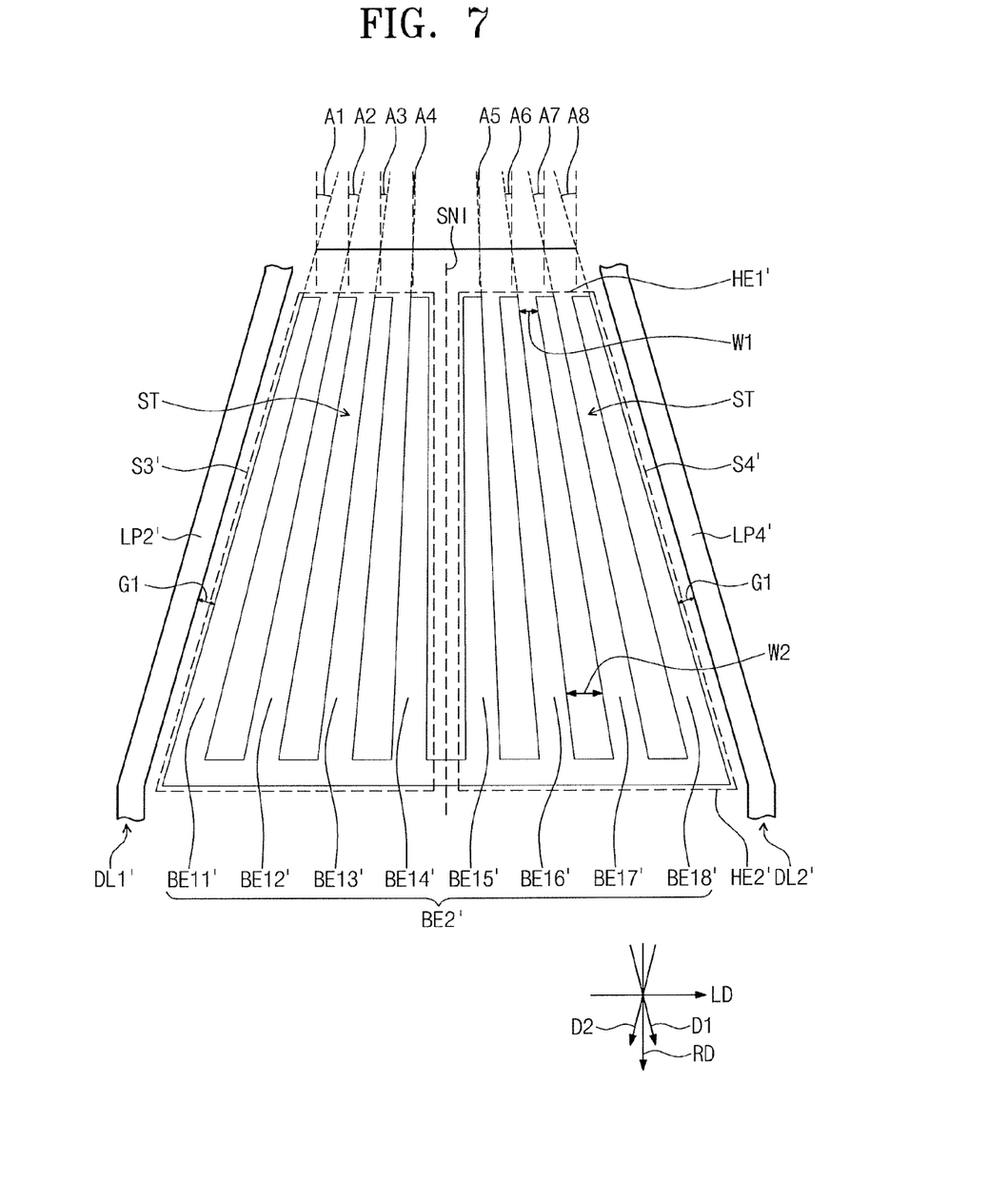
FIG. 7 is an enlarged view of the third branch electrodes shown in FIG. 6.

FIG. 7 is an enlarged view of the second branch electrodes shown in FIG. 6.

Referring to FIGS. 6 and 7, the second pixel electrode PE2' may be disposed in third and fourth domains DM3 and DM4, and the second pixel electrode PE2' may include second branch electrodes BE2'. The second branch electrodes BE2' may be arranged in the third and fourth domains DM3 and DM4, and the slit ST may be defined between adjacent two of the second branch electrodes BE2'.

In an exemplary embodiment of the present inventive concept, the second branch electrodes BE2' may extend substantially along the column direction RD. The angles at which the individual second branch electrodes BE2' extend with respect to the column direction may be different from each other.

The second branch electrodes BE2' may include first to eighth branch parts BE11'~BE18' between the first and second data lines DL1'~DL2'. A first acute angle A1 may be defined between the column direction RD and a direction in which the first branch part BE11' extends, a second acute angle A2 may be defined between the column direction RD and a direction in which the second branch part BE12' extends, a third acute angle A3 may be defined between the column direction RD and a direction in which the third branch part BE13' extends, and a fourth acute angle A4 may be defined between the column direction RD and a direction in which the fourth branch part BE14' extends. The first acute angle A1 may be larger than the second acute angle A2, the second acute angle A2 may be larger than the third acute angle A3, and the third acute angle A3 may be larger than the fourth acute angle A4.

A fifth acute angle A5 may be defined between the column direction RD and a direction in which the fifth branch part BE15' extends, a sixth acute angle A6 may be defined between the column direction RD and a direction in which the sixth branch part BE16' extends, a seventh acute angle A7 may be defined between the column direction RD and a direction in which the seventh branch part BE17' extends, and an eighth acute angle A8 may be defined between the column direction RD and a direction in which the eighth branch part BE18' extends. The eighth acute angle A8 may be larger than the seventh acute angle A7, the seventh acute angle A7 may be larger than the sixth acute angle A6, and the sixth acute angle A6 may be larger than the fifth acute angle A5.

The first to fourth acute angles A1~A4 may be acute angles defined in a clockwise direction with respect to the column direction RD and the fifth to eighth acute angles A5~A8 may be acute angles defined in a counterclockwise direction with respect to the column direction RD. Thus, when a first straight line SN1 is defined as being parallel with the column direction RD and passing between the fourth branch part BE14' and the fifth branch part BE15', the first to fourth branch parts BE11'~BE14' may be respectively symmetrical with the fifth to eighth branch parts BE15'~BE18' on the first straight line SN1.

Among the first to eighth branch parts BE11'~BE18', the first branch part BE11' most adjacent to the first data line DL1' may be substantially parallel with the second line part LP2' of the first data line DL1'. Among the first to eighth branch parts BE11'~BE18', the eighth branch part BE18' most adjacent to the second data line DL2' may be substantially parallel with the fourth line part LP4' of the second data line DL2'. Thus, a leakage of light around the first and second data lines DL1' and DL2' may be reduced or prevented.

Each of a first horizontal edge HE1' and a second horizontal edge HE2' may connect a third side S3' with a fourth side S4', and the first and second horizontal edges HE1' and HE2' may face each other. In an exemplary embodiment of the present inventive concept, the first horizontal edge HE1' may be longer than the second horizontal edge HE2'. When the slit ST has a first width W1 adjacent to the first horizontal edge HE1' and has a second width W2 adjacent to the second horizontal edge HE2', the second width W2 may be larger than the first width W1. A pitch between the first to eighth branch parts BE11'~BE18' adjacent to the first horizontal edge HE1' may be smaller than a pitch between the first to eighth branch parts BE11'~BE18' adjacent to the second horizontal edge HE2'.

Figure 8:
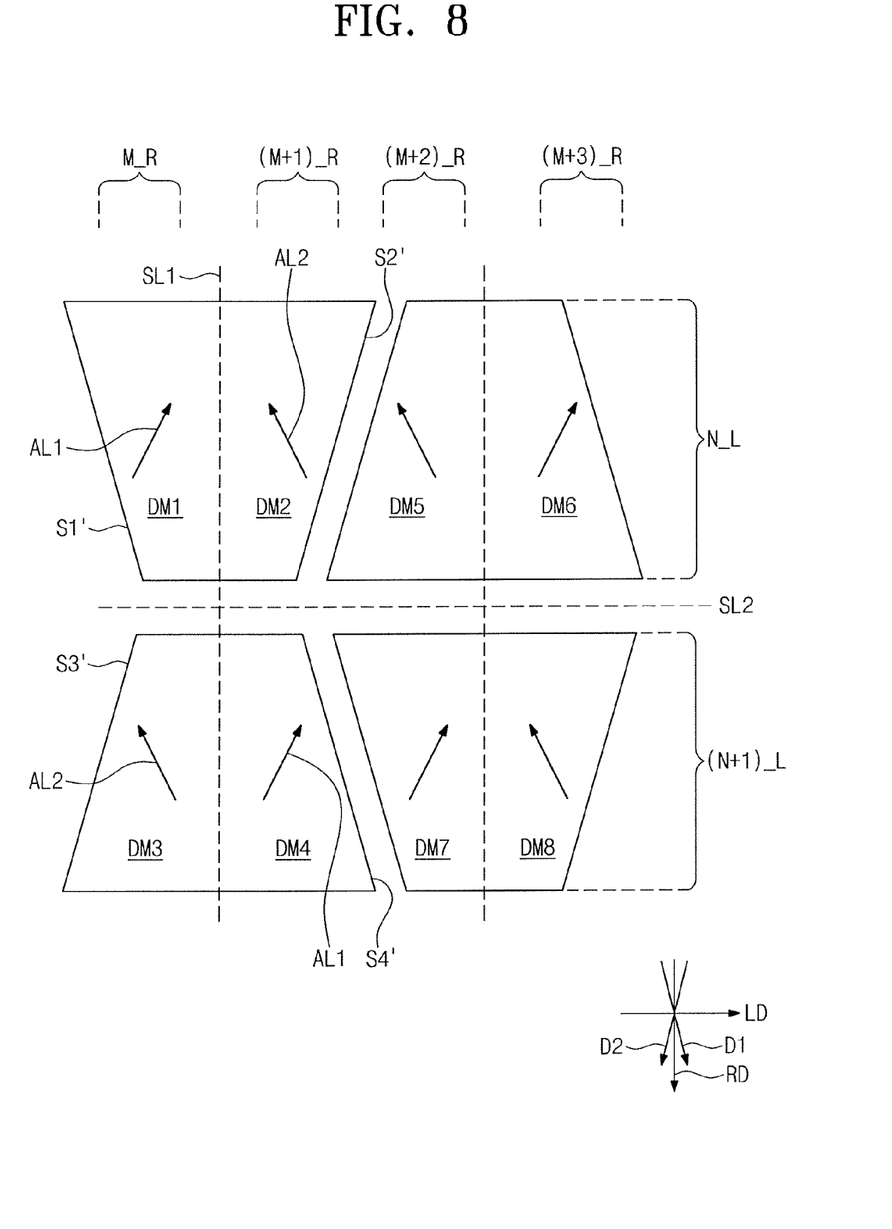
FIG. 8 is a view illustrating alignment directions of liquid crystal molecules defined in the domains shown in FIG. 6.

FIG. 8 is a view illustrating alignment directions of liquid crystal molecules defined in the domains shown in FIG. 6.

Referring to FIGS. 6 and 8, the first to fourth domains DM1~DM4 may have different shapes from each other and the fifth to eighth domains DM5~DM8 may have different shapes from each other. The first and seventh domains DM1 and DM7 may have substantially the same shape as each other, the second and eighth domains DM2 and DM8 may have substantially the same shape as each other, the third and fifth domains DM3 and DM5 may have substantially the same shape as each other, and the fourth and sixth domains DM4 and DM6 may have substantially the same shape as each other.

Among the first to eighth domains DM1~DM8, the first to fourth domains DM1~DM4 will be described below in more detail.

The first domain DM1 may have a first side S1' and the second domain DM2 may have a second side S2' facing the first side S1'. The third domain DM3 may have a third side S3' and the fourth domain DM4 may have a fourth side S4' facing the third side S3'.

The first side S1' may be parallel with the first direction D1 and the second side S2' may be parallel with the second direction D2. The third side S3' may be parallel with the second direction D2 and the fourth side S4' may be parallel with the first direction D1.

The first straight line SL1 may be defined between the first and second domains DM1 and DM2 and between the third and fourth domains DM3 and DM4. The first domain DM1 may be symmetrical with the second domain DM2 with respect to the first straight line SL1 and the third domain DM3 may be symmetrical with the fourth domain DM4 with respect to the first straight line SL1.

The second straight line SL2 may be defined between the first and third domains DM1 and DM3 and between the second and fourth domains DM2 and DM4. The first domain DM1 may be symmetrical with the third domain DM3 with respect to the second straight line SL2 and the second domain DM2 may be symmetrical with the fourth domain DM4 with respect to the second straight line SL2.

Liquid crystal molecules LM of the liquid crystal layer 250 may have a positive dielectric anisotropy and may be arranged in the first alignment direction AL1 in the first and fourth domains DM1 and DM4. The liquid crystal molecules LM may be arranged in the second alignment direction AL2 in the second and third domains DM2 and DM3. In an exemplary embodiment of the present inventive concept, the first alignment direction AL1 may intersect the second alignment direction AL2 and may be symmetrical with the second alignment direction AL2 with respect to the column direction RD.

While the present inventive concept has been shown and described with reference to the exemplary embodiments thereof, it will be apparent to those of ordinary skill in the art that various changes in form and detail may be made thereto without departing from the spirit and scope of the present inventive concept.

What is claimed is:

1. A liquid crystal display device comprising:
a display substrate, in which a plurality of domains is defined, including a pixel electrode disposed in each of the plurality of domains and configured to have a plurality of branch electrodes and a common electrode insulated from the pixel electrode;
an opposite substrate; and
a liquid crystal layer disposed between the display substrate and the opposite substrate,
wherein the plurality of domains is arranged in a column direction and a row direction,
wherein each of the domains includes a first side, a second side facing the first side, a first horizontal edge, and a second horizontal edge facing the first horizontal edge, wherein the second side is parallel with the column direction and the first side is parallel with a first slanted direction with respect to the column direction,
wherein a slit is defined between adjacent branch electrodes of the plurality of branch electrodes, and
wherein the slit has a first width adjacent to the first horizontal edge, and the slit has a second width, which is different from the first width, adjacent to the second horizontal edge.

2. The liquid crystal display device of claim 1, wherein the plurality of domains comprises a first domain including the first side and the second side, and a second domain arranged next to the first domain in the row direction,
wherein the second domain includes third and fourth sides facing each other, wherein the second and third sides are disposed between the first and fourth sides, wherein the fourth side is parallel with a second slanted direction, and wherein the second and third sides are parallel with the column direction.

3. The liquid crystal display device of claim 2, wherein the first slanted direction intersects the second slanted direction.

4. The liquid crystal display device according to claim 3, wherein the first slanted direction is symmetrical to the second slanted direction with respect to the column direction.

5. The liquid crystal display device according to claim 2, wherein the first side is longer than the second side and the fourth side is longer than the third side.

6. The liquid crystal display device according to claim 3, further comprising third and fourth domains sequentially arranged in the row direction,
wherein the first and third domains are sequentially arranged in the column direction and the second and fourth domains are sequentially arranged in the column direction,
wherein the third domain has fifth and sixth sides facing each other, the fourth domain has seventh and eighth sides facing each other, the sixth and seventh sides are disposed between the fifth and eighth sides, the fifth side is parallel with the second slanted direction and the eighth side is parallel with the first slanted direction, and the sixth and seventh sides are parallel with the column direction.

7. The liquid crystal display device according to claim 6, wherein the first slanted direction is symmetrical to the second slanted direction with respect to the column direction.

8. The liquid crystal display device according to claim 7, wherein the display device further comprises:
a plurality of gate lines; and
a plurality of data lines insulated from and crossing over the plurality gate lines,
wherein each of the data lines of the plurality of data lines comprises:
a first data line extending along the first and third domains and extending along the first and second slanted directions to be parallel with the first and fifth sides of the first and third domains;
a second data line arranged between the first and second domains and between the third and fourth domains, and extending along the column direction; and
a third data line disposed adjacent to the second and fourth domains, and extending along the first and second slanted directions to be parallel with the fourth and eighth sides of the second and fourth domains.

9. The liquid crystal display device according to claim 8, wherein the first data line is symmetrical to the third data line with respect to the second data line.

10. The liquid crystal display device according to claim 7, wherein liquid crystal molecules of the liquid crystal layer are aligned in a first orientation in the first domain, aligned in a second orientation, which intersects the first orientation, in the second domain, aligned in the second orientation in the third domain, and aligned in the first orientation in the fourth domain.

11. The liquid crystal display device according to claim 10, wherein the first orientation is parallel with the second slanted direction and the second orientation is parallel with the first slanted direction.

12. The liquid crystal display device according to claim 11, wherein the first orientation is symmetrical to the second orientation with respect to the column direction.

13. The liquid crystal display device according to claim 7, wherein the fifth side is longer than the sixth side and the eighth side is longer than the seventh side.

14. The liquid crystal display device according to claim 7, wherein the plurality of domains further comprises a fifth domain, a sixth domain, a seventh domain, and an eighth domain,
wherein the fifth and seventh domains and the sixth and eighth domains are arranged in the column direction,
wherein the fifth and sixth domains are sequentially arranged next to the first and second domains in the row direction and the seventh and eighth domains are sequentially arranged next to the third and fourth domains in the row direction, and
wherein the first and seventh domains have substantially the same shape as each other, the second and eighth domains have substantially the same shape as each other, the third and fifth domains have substantially the same shape as each other, and the fourth and sixth domains have substantially the same shape as each other.

15. The liquid crystal display device of claim 1, wherein acute angles defined between the column direction and each of the branch electrodes becomes smaller closer to the first side, and the acute angles become larger closer to the second side.

16. The liquid crystal display device of claim 1, wherein the second horizontal edge is longer than the first horizontal edge and the second width is wider than the first width.

17. A liquid crystal display device comprising:
a display substrate comprising a pixel electrode including a plurality of branch electrodes and a common electrode insulated from the pixel electrode, wherein slits are defined between each of the branch electrodes;
an opposite substrate; and
a liquid crystal layer disposed between the display substrate and the opposite substrate,
wherein a plurality of domains is arranged in a column direction and a row direction, and a first domain and a second domain are arranged in the row direction,
wherein the first domain has a first side, and the second domain has a second side, and
wherein the first side is parallel with a first slanted direction with respect to the column direction and the second side is parallel with a second slanted direction with respect to the column direction intersecting with the first slanted direction.

18. A liquid crystal display device comprising:
a display substrate comprising a pixel electrode including a plurality of branch electrodes and a common electrode insulated from the pixel electrode, wherein slits are defined between each of the branch electrodes;
an opposite substrate; and
a liquid crystal layer disposed between the display substrate and the opposite substrate,
wherein a plurality of domains is arranged in a column direction and a row direction, and a first domain and a second domain are arranged in the row direction,
wherein the first domain has a first side, and the second domain has a second side, and
wherein the first side is parallel with a first slanted direction with respect to the column direction and the second side is parallel with a second slanted direction with respect the column direction,
wherein a first horizontal edge and a second horizontal edge facing the first horizontal edge are defined in the first domain and the second domain, wherein the first and second horizontal edges are parallel with the row direction, and wherein each slit has a first width adjacent to the first horizontal edge and a second width, which is different from the first width, adjacent to the second horizontal edge.

19. The liquid crystal display device of claim 17, wherein the plurality of domains comprises a third domain and a fourth domain that are sequentially arranged in the row direction,
wherein the first and third domains are sequentially arranged in the column direction, and the second and fourth domains are sequentially arranged in the column direction,
wherein the third domain has a third side, the fourth domain has a fourth side facing the third side, and wherein the third side is parallel with the second side.

20. The liquid crystal display device of claim 19, wherein liquid crystal molecules of the liquid crystal layer are arranged along a first alignment direction in the first and fourth domains, and the liquid crystal molecules are arranged along a second alignment direction, which intersects the first alignment direction, in the second and third domains.

* * * * *